United States Patent
Johnson

(10) Patent No.: US 6,811,149 B1
(45) Date of Patent: Nov. 2, 2004

(54) FATIGUE AND DAMAGE TOLERANT COIL SPRING

(76) Inventor: Daniel E. Johnson, 2410 Castle Rock Rd., Arlington, TX (US) 76006

( * ) Notice: Subject to any disclaimer, the term of this patent is extended or adjusted under 35 U.S.C. 154(b) by 0 days.

(21) Appl. No.: 10/694,281

(22) Filed: Oct. 27, 2003

(51) Int. Cl.⁷ .................................................. F16F 1/06
(52) U.S. Cl. ........................................ 267/167; 29/90.7
(58) Field of Search ................................ 267/167, 169, 267/166, 248, 286, 155; 72/53, 54, 55, 66; 29/90.7

(56) References Cited

U.S. PATENT DOCUMENTS

| | | | |
|---|---|---|---|
| 2,249,677 A | * | 7/1941 | Wallace ........................ 72/53 |
| 3,073,022 A | | 1/1963 | Bush et al. |
| 4,067,240 A | | 1/1978 | Straub |
| 4,604,881 A | * | 8/1986 | Lienert ......................... 72/53 |
| 6,027,577 A | * | 2/2000 | Mikura et al. ................ 72/53 |
| 6,200,689 B1 | | 3/2001 | Ferrigno et al. |
| 6,346,157 B1 | | 2/2002 | Takezawa et al. |
| 6,449,998 B1 | | 9/2002 | Takeda et al. |
| 6,544,360 B1 | | 4/2003 | Tange et al. |
| 6,551,064 B1 | | 4/2003 | Mannava et al. |

FOREIGN PATENT DOCUMENTS

| | | | | |
|---|---|---|---|---|
| JP | 60096717 A | * | 5/1985 | ............ C21D/7/06 |
| JP | 2002361558 A | * | 12/2002 | ............ B24C/1/10 |

* cited by examiner

*Primary Examiner*—Robert A. Siconolfi
*Assistant Examiner*—Melanie Torres

(57) ABSTRACT

Predetermined non-uniform residual compressive stress distributions are induced in the spring wire of metallic coil springs. The residual compressive stress tends to reduce deleterious effects of both fatigue and coil binding impacts on spring performance. Transverse cross-sections of coil spring wire reveal non-uniform distributions of residual compressive stress that exhibit substantial symmetry about various transverse axes, including axes connecting potential or actual opposing coil binding contact points on the spring wire surface. Residual compressive stress in coil spring wire of the present invention may also vary in a predetermined manner when measured longitudinally along the coil spring wire.

2 Claims, 3 Drawing Sheets

Section B-B
of Figure 1A

FATIGUE AND DAMAGE TOLERANT COIL SPRING

FIELD OF THE INVENTION

The invention relates generally to springs. More particularly, the invention relates to metallic coil springs subject to coil binding.

BACKGROUND

Metallic coil springs are generally subject to fatigue failure after many displacement cycles. Fatigue results from the cyclic tensile and compressive stresses induced in active portions of the coil spring wire (i.e., those portions that resist bending during spring displacements). In their resistance to bending forces, these portions of the coil spring wire are analogous to the flanges of an I-beam. And as the web of an I beam comprises an area between the flanges (the neutral plane) that typically experiences little or none of the cyclic stress in the flanges, the inner portion of a coil spring wire has an analogous (generally curved) neutral plane.

During normal displacement cycles of a coil spring, linear displacement occurs substantially parallel to the spring's longitudinal coil axis, which is the axis about which the spring wire is coiled. Such cyclic coil spring displacement tends to alternately increase and decrease the distance between adjacent coils. And under certain dynamic conditions (e.g., when standing and/or traveling waves in the spring have sufficient magnitude) the distance between adjacent coils may be reduced to zero (i.e., adjacent spring coils may come into contact).

To increase the tolerance of a metal structure to fatigue and thus lengthen service life, special techniques have been developed to reduce or eliminate cyclic tensile stresses in certain portions of the structure that would otherwise be subject to them. Techniques to thus extend service life include the introduction of residual compressive stresses within and near metallic surfaces of the structure by cold working the surfaces using, for example, shot peening, laser shock peening or burnishing. The residual compressive stresses thus created tend to add algebraically to tensile stresses created during force cycling, with the (ideal) result that the structure surface experiences little net cyclic tensile stress. Under these conditions the structure becomes relatively tolerant of cyclic force applications that would otherwise predispose it to early fatigue failure at a surface. Instead, the presence of relatively high residual compressive stress levels at and near a structure's surface tends to shift the likely origin of fatigue failure from the surface (which is prone to fatigue damage due to surface roughness, discontinuities, micro-cracks, etc.) toward the (relatively smoothly continuous) central portion of the structure that can better tolerate tensile stress. See, for example, U.S. Pat. Nos. 6,200,689; 6,449,998 and 6,551,064, incorporated herein by reference.

The above techniques have been used to improve fatigue tolerance in springs operating in demanding environments. Specifically, different peening techniques (e.g., variations of two-stage or double shot-peening) have been developed to extend the depth of residual compressive stress under a surface while retaining relatively high residual stress at and near the spring surface. See, for example, U.S. Pat. Nos. 3,073,022; 6,346,157 and 6,544,360, incorporated herein by reference. Note however that when a spring is at rest, the aggregate total of residual compressive stress induced by working the spring wire surface must be balanced by tensile forces in the portions (core area) of the spring wire that are not under residual compressive stress.

Consequently, while some of the fatigue-related effects of high cyclic tensile forces can be reduced by inducing residual compressive stress at and near a spring wire surface, consideration must also be given to the potentially deleterious effects of the balancing tensile stress thereby required in the wire core area (near what would otherwise be the wire's neutral plane). Particular care must be taken to avoid tensile stress levels in the core that are high-enough to cause plastic deformation of the spring metal.

Thus, proper depth and magnitude of induced residual compressive stress are important parameters in metallic coil spring design, and improvements in spring performance are consequently limited by several factors. Such factors include the method(s) of inducing residual compressive stress at and near the spring wire's surface, as well as the magnitude and distribution of balancing tensile stress present in and near the core area. Since balancing tensile stress can not be allowed to exceed a predetermined maximum value, depending on a spring wire's core material, there is an effective limitation on the aggregate total of residual compressive stress that can safely be created at and near the spring wire surface.

In practice, peak residual stress values near the surface of the spring wire may be so limited that surface tensile stress occurring during spring cycling will overwhelm residual compressive stress to place portions of the spring wire surface in net tension during part of a displacement cycle. If sufficiently large, this net tensile stress can significantly increase the spring's susceptibility to fatigue failure at the surface. Note that this tendency for the spring wire surface to experience net tensile stress is further exacerbated by the fact that the theoretical maximum achievable amount of residual compressive stress is actually lower in the thin metal surface layer of spring wire than in the layer of metal located immediately below the wire surface (hereinafter the subsurface metal layer).

The limitations described above on the depth, distribution, peak values and aggregate total of residual compressive stress that may be induced in coil spring wire impose particularly significant manufacturing constraints on springs comprising relatively small wire. Additional limitations are manifest in springs that operate at high speeds that are associated with adverse dynamic effects which further increase the likelihood of fatigue failure. One such adverse dynamic effect is coil binding.

Coil binding occurs when adjacent active coils in a spring come into momentary contact during rapid cycling. Each such coil binding contact creates impact forces that can raise surface tensile stress levels above the values of residual compressive stress that may have been previously established to resist fatigue failure. Under coil-binding conditions then, springs may fail prematurely even though they have been conventionally treated to increase fatigue tolerance by inducing sufficient residual compressive stress for applications that are not likely to cause coil binding. Further, such premature spring failure is likely to be initiated at the spring wire surface near areas of momentary coil binding contact. The present invention relates to methods and apparatus for reducing the likelihood of such premature spring failure.

SUMMARY OF THE INVENTION

The present invention relates to metallic coil springs having non-uniform residual compressive stress distributions induced in the spring wire that tend to reduce the likelihood of premature failure due to combined effects of fatigue and coil binding impacts. The invention includes methods and apparatus for making such springs, including methods for inducing desired residual compressive stress distributions in the spring wire.

Representations of residual compressive stress in cross-sections of coil spring wire of the present invention reveal non-uniform distributions having magnitudes that vary in characteristic ways along one or more spring wire axes. For example, a representation of residual compressive stress in a transverse cross-section of coil spring wire of the present invention exhibits substantial symmetry about a transverse axis connecting potential or actual opposing coil binding contact points on the spring wire surface (hereinafter an opposing contact axis). Further, residual compressive stress in coil spring wire of the present invention also varies in a predetermined manner when measured along the longitudinal axis of the wire. This stems from the fact that during cyclic displacements of a coil spring, the wire comprising the coil spring typically experiences substantially different stress levels along the course of its longitudinal axis (e.g., differences seen when comparing the portions near the coil ends to the relatively unsupported coil portion between the coil ends.

An illustrated embodiment of the present invention shows a coil spring comprising metal wire, the coil spring having an inner coil diameter, an outer coil diameter, a coil pitch, a coil circumference, first and second coil ends, and a coil length along a coil axis. The metal wire has a longitudinal wire axis, a wire length, a wire surface, a subsurface layer, and at least one transverse cross-section with two opposing coil binding contact points on the wire surface, the two opposing coil binding contact points establishing an opposing contact axis. Further, each such transverse cross-section has a predetermined transverse residual compressive stress magnitude distribution within the wire. And the predetermined transverse residual compressive stress magnitude distribution is substantially symmetrical about the opposing contact axis.

The above coil spring may, in alternative embodiments, additionally have at least one such predetermined transverse residual compressive stress magnitude distribution that is substantially symmetrical about a perpendicular bisector of the opposing contact axis, the perpendicular bisector intersecting the opposing contact axis at an origin. Other embodiments may also, additionally or alternatively, incorporate at least one predetermined transverse residual compressive stress magnitude distribution wherein magnitudes of residual compressive stress in the coil spring wire increase monotonically along a portion of an opposing contact axis. The portion of an opposing contact axis along which such residual compressive stress is monotonically distributed begins at a point on the opposing contact axis between the origin and the subsurface layer. From this beginning point, residual compressive stress in the spring wire increases in magnitude monotonically as an inverse function of distance from the spring wire's subsurface layer. Further, still other embodiments may incorporate at least one predetermined transverse residual compressive stress magnitude distribution wherein the distribution extends along the wire's longitudinal axis for a distance greater than the coil circumference.

The present invention also comprises a peening mask for selective peening of a coil spring, as well as methods for using the peening mask to selectively peen a coil spring that comprises metal spring wire and has an inner coil diameter, an outer coil diameter, a coil pitch, and a coil length along a coil spring axis. The illustrated embodiment of the peening mask comprises a cylindrical inner shield and a coiled outer shield. The cylindrical shield has a diameter slightly less than the inner coil spring diameter and a length not less than the coil length. The coiled outer shield has an inner diameter slightly greater than the outer coil spring diameter, a pitch substantially equal to said coil spring pitch, and a length not less than the coil length.

Note that the illustrated coiled outer shield comprises a relatively conformal surface which in use is adjacent to (and generally conforms to) a portion of the coil spring wire surface. In contrast, the illustrated cylindrical shield does not comprise a relatively conformal surface. In practice, various embodiments of the invention may comprise relatively conformal surfaces on either the coiled outer shield or the cylindrical inner shield or neither shield or both shields. Note also that relatively conformal surfaces may be obtained on a metallic shield by, for example, machining, molding or forging operations. An elastomeric shield, on the other hand, may comprise a relatively conformal surface that is obtained by molding and/or by allowing the spring wire to directly deform a portion of the elastomer in contact with the wire.

In conventional manufacture of a coil spring, a coil of wire shaped like a spring is typically provided with an initial overall high-energy peening (e.g., a peening with relatively large shot) to induce a first distribution of residual compressive stress in the wire. While such a residual compressive stress distribution might be induced by methods other than shot peening (e.g., laser shock peening), shot peening may provide adequate initial residual compressive stress levels at lower cost.

If a dual peening process were selected for the above (conventionally manufactured) spring, the initial overall peening step would commonly be followed by a second overall peening with relatively smaller shot (most beneficially applied at a relatively lower intensity). But if this two-step procedure were to be followed for coil springs comprising relatively thin wire and subject to coil binding, the depth of compressive stress required to resist coil binding impacts would affect such a large proportion of the wire cross-section that the wire core would be over-stressed by the necessary compensatory tensile forces.

Thus, in the present invention the depth of residual compressive stress is varied around the wire circumference, being deeper in regions more directly affected by coil binding impacts. That is, localized predetermined non-uniform distributions of residual compressive stress are induced near coil binding contact points and along opposing contact axes through use of a coiled outer shield and cylindrical inner shield in conjunction with overall high-energy peening. The choices among parameters (e.g., shot size, shot hardness and shot velocity) during peening, as well as choices of surface finish, involve relationships among the variables for each application. See, for example, U.S. Pat. No. 4,067,240, incorporated herein by reference.

The localized high-energy shot peening described above may be obtained, for example, through use of a coiled outer shield in which the coil spring is inserted to form a first assembly, after which a cylindrical inner shield is inserted within the first assembly to form a second assembly. After alignment of the cylindrical inner shield and the coiled outer shield with the coil spring as described and illustrated herein, the second assembly may be subjected to overall high-energy peening. Because of the shields' effects, however, the coil spring will experience the localized high-energy peening needed to produce a fatigue and impact tolerant coil spring of the present invention. To manufacture such a spring, the localized high-energy shot peening may be combined with overall shot peening performed at lower intensity levels in traditional fashion.

The shielding provided to the coil spring by the above second assembly is necessary if the relatively deeper predetermined non-uniform distributions of relatively higher level residual compressive stress localized near coil binding contact points and along opposing contact axes are to be provided by overall high-energy shot peening. However, the ability to focus laser shock peening so that residual compressive stress induced thereby is both relatively localized and relatively deep means that laser shock peening may be used as an alternative technique to obtain effects analogous to those produced by localized shot peening. Since laser shock peening can be focused, such analogous effects can be produced without the need for a cylindrical inner shield and a coiled outer shield as described above. Such localized high-energy laser shock peening may be combined with overall shot peening performed at lower intensity levels in traditional fashion to produce a fatigue and impact tolerant coil spring.

Besides affording the opportunity to closely define the depth and magnitude of an area of residual compressive stress without use of shields, use of laser shock peening results in less deterioration of a spring wire surface finish when compared to shot peening at high intensities. Because of this, development and preservation of desirable surface finish properties in a coil spring may be accomplished in conjunction with the above-described application of laser shock peening.

DETAILED DESCRIPTION OF ILLUSTRATED EMBODIMENTS

Figure 1A:
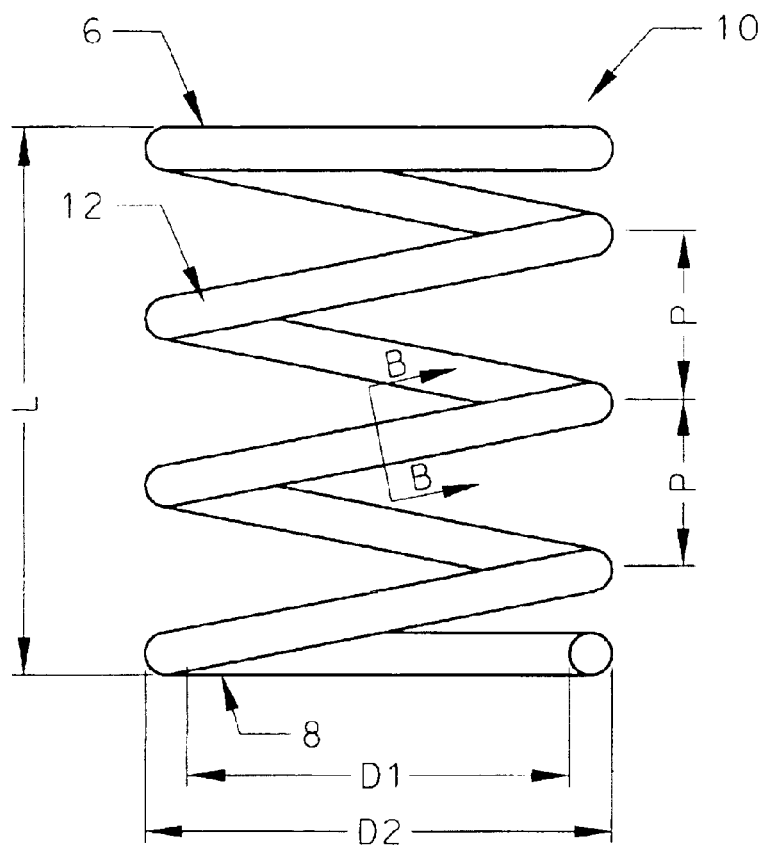
FIG. 1A schematically illustrates a side elevation of a metallic coil spring of the present invention.

FIG. 1A schematically illustrates a side elevation of a coil spring 10 comprising metallic spring wire 12 having a wire surface 14 (see FIG. 1B) and formed in a coil having a pitch P, a coil length L measured between first and second coil ends 6 and 8 respectively along a longitudinal coil axis which is vertical in the illustration, an inner coil diameter D1, an outer coil diameter D2, a coil circumference approximately equal to the product (3.14)(D2), and a total length of spring wire 12 approximately equal to the product (3.14)(D2)(L/P).

Figure 1B:
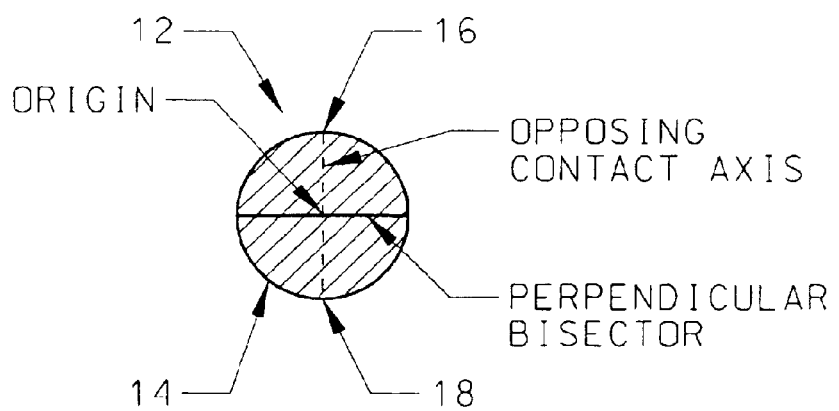
FIG. 1B schematically illustrates transverse cross-section B—B of the metallic spring wire shown in FIG. 1A.

FIG. 1B schematically illustrates the transverse cross-section B—B of spring wire 12 indicated in FIG. 1A. Opposing coil binding contact points 16 and 18 are shown on wire surface 14 at opposite ends of an opposing contact axis. A perpendicular bisector of the opposing contact axis crosses the axis at a point called the origin.

Figure 2:
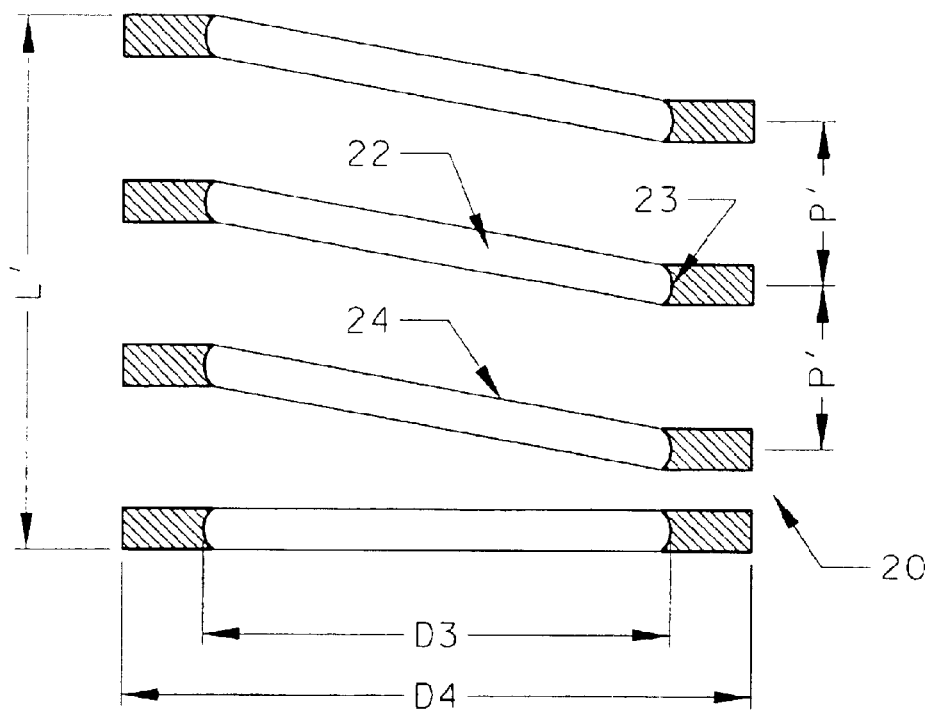
FIG. 2 schematically illustrates a longitudinal cross-section of a peening mask coiled outer shield.

FIG. 2 schematically illustrates a longitudinal cross-section of a peening mask coiled outer shield 20 comprising elongated outer shield stock 22 having a shield stock surface 24 and formed in a coil having a pitch P', a coil length L' measured along a longitudinal coiled outer shield axis which is vertical in the illustration, an inner coil diameter D3, an outer coil diameter D4, a coil circumference approximately equal to the product (3.14)(D4), and a total length of elongated shield stock 22 approximately equal to the product (3.14)(D4)(L/P). Shield stock surface 24 comprises conformal surface 23, which facilitates closer shielding of coil spring 10 by coiled outer shield 20. Note that for effective shielding of coil spring 10, the pitch P' of coiled outer shield 20 is substantially equal to coil pitch P of coil spring 10, and coil length L' of coiled outer shield 20 is equal to or greater than coil length L of coil spring 10. Note also that inner coil diameter D3 of coiled outer shield 20 is slightly greater than outer coil diameter D2 of coil spring 10, thereby allowing for a close sliding fit of coil spring 10 within coiled outer shield 20 to form a first assembly 40 (see FIG. 4).

Figure 3:
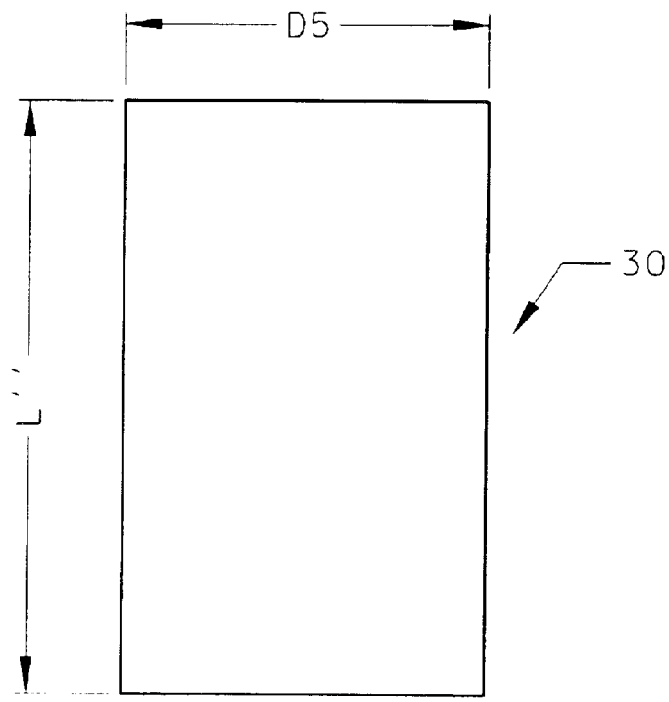
FIG. 3 schematically illustrates a side elevation of a peening mask cylindrical inner shield.

FIG. 3 schematically illustrates a longitudinal cross-section of a peening mask cylindrical inner shield 30 having a diameter D5 and a length L". Note that inner shield diameter D5 is slightly less than inner coil diameter D1 of coil spring 10, and inner shield length L" is approximately equal to coil length L of coil spring 10, thereby allowing for a close sliding fit of cylindrical inner shield 30 within coil spring 10.

Figure 4:
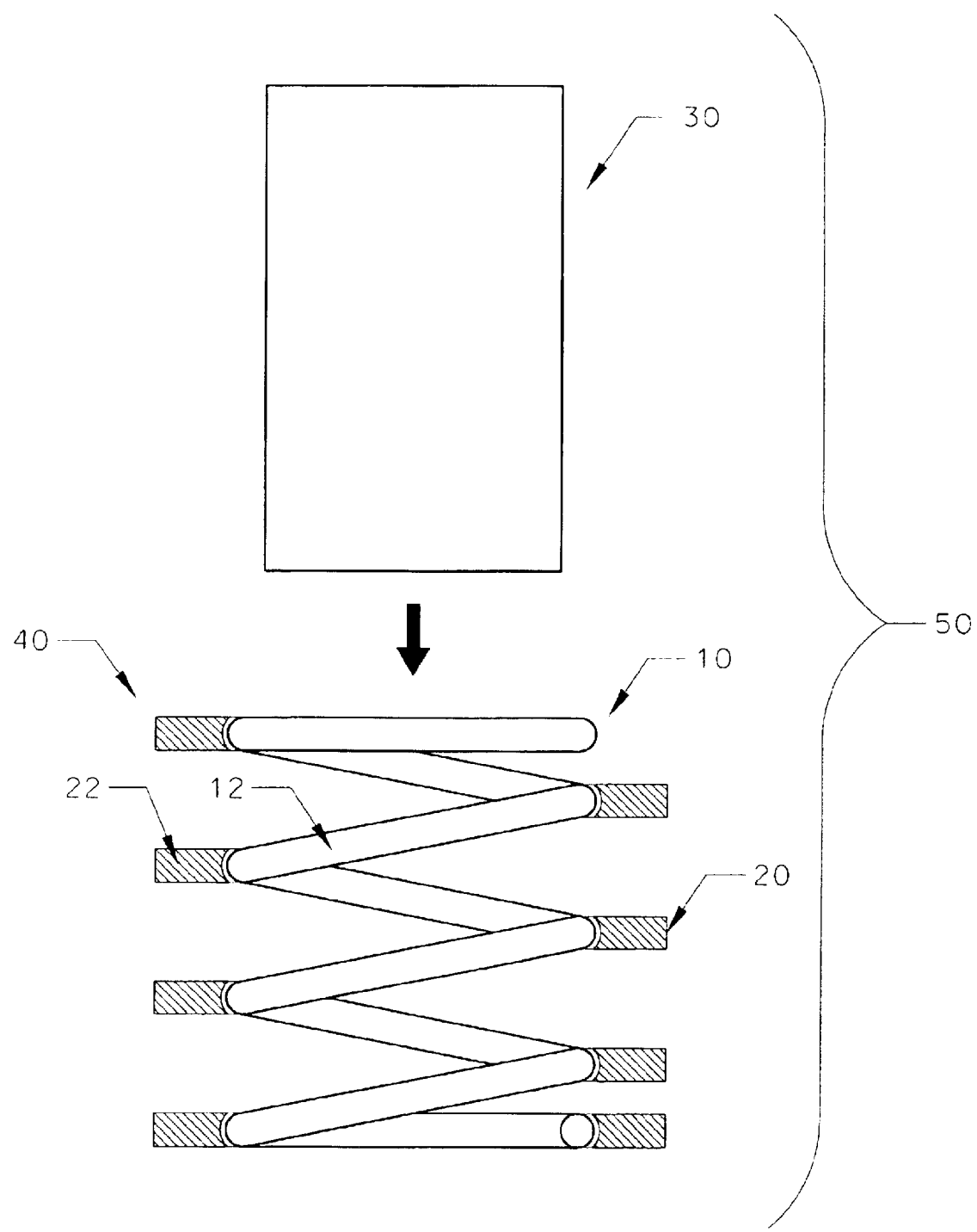
FIG. 4 schematically illustrates a side elevation of a coil spring (as shown in FIG. 1A) inserted and aligned within a peening mask coiled outer shield (as shown in longitudinal cross-section in FIG. 2) to form a first assembly. A peening mask cylindrical inner shield (see FIG. 3) is shown in position to be inserted within the first assembly to form a second assembly.

FIG. 4 schematically illustrates a longitudinal cross section of coil spring 10 (as shown in FIG. 1A) inserted and aligned within a peening mask coiled outer shield 20 (as shown in longitudinal cross-section in FIG. 2) to form a first assembly 40. Note that aligning coil spring 10 and coiled outer shield 20 minimizes the distance between spring wire 12 and outer shield stock 22. A peening mask cylindrical inner shield 30 (as shown in FIG. 3) is shown in position to be inserted within first assembly 40 to form a second assembly 50.

What is claimed is:

1. A method for selective peening of a coil spring that comprises metal wire and has an inner coil spring diameter, an outer coil spring diameter, a coil spring pitch, and a coil spring length along a coil spring axis, the method comprising
    providing a peening mask for selective peening of said coil spring, said peening mask comprising
        a cylindrical inner shield having a diameter slightly less than said inner coil spring diameter and a length not less than said coil spring length; and
        a coiled outer shield having an inner diameter slightly greater than said outer coil spring diameter and having a pitch substantially equal to said coil spring pitch; and
    inserting said cylindrical inner shield within the coil spring to form a first assembly;
    inserting said first assembly within said coiled outer shield to form a second assembly;
    aligning said cylindrical inner shield and said coiled outer shield with the coil spring; and
    peening said second assembly.

2. A peening mask for selective peening of a coil spring that comprises metal wire and has an inner coil spring diameter, an outer coil spring diameter, a coil spring pitch, and a coil spring length along a coil spring axis, said peening mask comprising
    a cylindrical inner shield having a diameter slightly less than said inner coil spring diameter and a length not less than said coil spring length; and
    a coiled outer shield having an inner diameter slightly greater than said outer coil spring diameter and having a pitch substantially equal to said coil spring pitch.

* * * * *